United States Patent [19]

Collington

[11] 4,029,612

[45] June 14, 1977

[54] SILICA CONTAINING BLOWING AGENT COMPOSITIONS AS PLATE-OUT PREVENTIVES IN FOAMED PLASTICS PROCESSES

[75] Inventor: Kenneth Thomas Collington, Loughborough, England

[73] Assignee: Fisons Limited, England

[22] Filed: Mar. 25, 1975

[21] Appl. No.: 562,035

Related U.S. Application Data

[63] Continuation-in-part of Ser. No. 328,079, Jan. 30, 1973, which is a continuation-in-part of Ser. No. 164,473, July 20, 1971.

[30] Foreign Application Priority Data

| July 31, 1970 | United Kingdom | 37047/70 |
| Aug. 5, 1970 | United Kingdom | 37779/70 |
| Aug. 26, 1970 | United Kingdom | 41006/70 |
| Dec. 7, 1972 | United Kingdom | 56562/72 |

[52] U.S. Cl. .................. 260/2.5 E; 260/2.5 HA; 260/DIG. 26; 264/49; 264/54

[51] Int. Cl.² ................... B29D 27/09; C08J 9/00

[58] Field of Search ... 260/2.5 HA, 2.5 E, DIG. 26; 264/54, 49

[56] References Cited

UNITED STATES PATENTS

| 3,260,688 | 7/1966 | Watanabe et al. | 260/2.5 |
| 3,511,787 | 5/1970 | Bertorelli et al. | 260/2.5 |
| 3,677,981 | 7/1972 | Wada et al. | 260/2.5 S |
| 3,743,605 | 7/1973 | La Clair | 252/350 |
| 3,882,209 | 5/1975 | Yanagisawa et al. | 260/2.5 E X |

OTHER PUBLICATIONS

Iler, *The Colloidal Chemistry of Silica and Silicates* (Cornell, 1955) pp. 157–159, 167–174, 194–195.

*Primary Examiner*—Murray Tillman
*Assistant Examiner*—T. DeBenedictis, Sr.
*Attorney, Agent, or Firm*—Wenderoth, Lind & Ponack

[57] ABSTRACT

The present invention relates to blowing agent compositions, to foamable thermoplastic compositions, to a process for preparing articles obtained by foaming such compositions, and to the articles obtained by such a process.

18 Claims, No Drawings

SILICA CONTAINING BLOWING AGENT COMPOSITIONS AS PLATE-OUT PREVENTIVES IN FOAMED PLASTICS PROCESSES

The present application is a continuation-in-part of Ser. No. 328,079, filed Jan. 30, 1973, which in turn is a continuation-in-part of Ser. No. 164,473, filed July 20, 1971.

The expansion of thermoplastic materials by the decomposition of a blowing agent therein has found widespread use for forming sheet materials and articles in many forms. Azodicarbonamide is a particularly useful blowing agent but its residue after decomposition contains an appreciable amount of cyanuric acid. The formation of cyanuric acid is a severe drawback in both extrusion and injection moulding operations where, because of its affinity for metals, it 'plates out' on the metal surfaces causing both general corrosion as well as surface damage to the extrudates or mouldings. It is a particular nuisance in extrusion where production lines have to be shut down at regular intervals to remove the cyanuric acid deposits from the extruder screw.

The addition of silica to certain plasticised polyvinyl chloride plastisols has already been proposed by Bertorelli in U.S. Pat. No. 3,511,787. Bertorelli found that certain highly specific silicas, produced according to U.S. Pat. No. 3,328,124, had the effect of promoting the action of blowing agents in plasticised polyvinyl chloride.

These silicas are defined as being discrete particles which have a distinctly phylloidal (leaf-like) structure characterised among other things, by a very great width to thickness ratio, or thinness. These silicas by chemical analysis, contain at least 82% by weight of $SiO_2$ together with at least 5% of bound or combined $H_2O$ and less than 12% of other oxides. Structurally, the atoms of silicon, oxygen and hydrogen are linked in an orderly laminar arrangement giving the individual particles their distinctly phylloidal form. The siliceous materials are further described as having variegated facial dimensions in the range of from about 0.1 to 5 microns, the preponderant particle widths generally being about 0.5 to 2 microns. Their thicknesses are smaller, ranging typically from as little as about 0.005 micron up to about 0.050 micron. As shown, for example, by stereoptic and shadowgraphic electron micrographs, their characteristic or preponderant thickness amounts to about 0.008 to about 0.015 micron and the particles thus have an extremely high characteristic width to thickness ratio, of the order of magnitude of 100 to 1.

The BET surface areas of the silicas as determined by the well known Brunauer, Emmett, and Teller Method ('BET Multilayer Absorption Theory,' Journal of the Americal Chemical Society, vol 60, 1938, page 309), generally is in the range of about 40 to 130 square meters per gram.

These materials are further characterised by having their total surface area constituted to a very important extent by measurable porosity in the elementary particles. From about 10 to about 40% of the surface area is formed by pores.

Bertorelli has disclosed that these highly reactive silicas have an activating effect on blowing agents, including azodicarbonamide.

I have now found that certain other particulate silicas, having a higher surface area than those disclosed by Bertorelli, can be used with azodicarbonamide, provided the water content of the composition is carefully controlled, to overcome the problems of plate out. These new blowing agent compositions accordingly lend themselves to injection and extrusion moulding processes, although they are of course available for other applications. The particulate compositions are stable and free-flowing; in addition they are less subject to the conglomeration some times associated with particulate azodicarbonamide, and they promote a fine even foam structure.

Accordingly, the present invention provides a particulate blowing agent composition azodicarbonamide, and a silica having a BET surface area of 200 to 400 $m^2/g$, preferably 250 to 300 $m^2/g$, and an available water content of 2 to 20% by weight, the weight ratio of azodicarbonamide to silica being from 1:5 to 5:1 and such as to provide 1.5 to 20 parts by weight available water to 100 parts by weight azodicarbonamide.

The available water in the silica may be provided by both free and combined water and is defined as the water evolved from the silica by heating for 4 hours at 500° C.

Preferably the finely divided silica is colloidal or fume silica, and most preferably has a BET surface area of 250 to 300 $m^2/g$.

The weight ratio of azodicarbonamide to silica may be 1:5 to 5:1 depending on the water content of the silica, but preferably, the compositions contain azodicarbonamide and silica in a weight ratio of 100 parts azodicarbonamide to 40 to 80 parts, preferably 50 to 75 parts silica.

If desired, the compositions may also include other compounds containing available water. Suitable compounds include metal silicates and hydrated salts and oxides such as calcium chloride, calcium oxalate, calcium sulphate, calcium carbonate, hydrated calcium oxide, calcium hydroxide, calcium tartrate, magnesium sulphate, magnesium orthophosphate, magnesium hydroxide, magnesium benzoate, potassium carbonate, copper sulphate, zinc sulphate, ferric sulphate, borax, barium hydroxide and aluminium hydroxide. It is preferred that where such hydrated salts are added to the composition, the total available water content of the mixture does not exceed 20% parts by weight per 100 parts by weight azodicarbonamide.

The particle size of the azodicarbonamide is suitably from 3 to 15 microns average particle diameter.

In a further preferred embodiment of the invention, the thermoplastic composition may contain oxamide which has been found to be an effective nucleating agent for the blowing agent. The oxamide is suitably present in a weight ratio of azodicarbonamide to oxamide suitably being from 2:1 to 1:2, and preferably about 1:1.

The particulate blowing agent compositions may be prepared by blending or milling the components together or by mixing in any other suitable manner.

The particulate blowing agent may be incorporated into a thermoplastic polymeric material to form a 'master batch', that is, a high concentration of blowing agent for ready dispersal in the plastisol to be expanded, or to form the foamable plastisol itself. Suitable thermoplastic polymeric materials include polyolefins (such as ployethylene, polypropylene and polybutylene) olefin copolymers (such as co-polyethylene/-propylene and polyethylene/vinyl acetate), polystyrene, styrene copolymers (such as acrylonitrile/- butadiene/styrene copolymers), polyvinyl chloride, and vinyl chloride copolymers.

The thermoplastic composition may also contain one or more additives such as other polymeric materials, dyes, pigments, stabilisers, dispersants, solvents, fillers, extenders, other blowing agents and kickers for the blowing agents.

Preferably the composition contains at least one kicker for the azodicarbonamide. Suitable kickers include compounds of zinc, cadmium, lead or tin, urea, ethanolamine, glycols or other blowing agents such as benzenesulphonhydrazide. The compounds of zinc, cadmium, lead or tin may also act as stabilisers for the composition. The concentration of kicker in the composition is suitably from 0.1% to 5.0% by weight, but lower or higher concentrations may be used if so desired.

The thermosplastic composition may also contain a metal stearate (for example magnesium, zinc or barium stearate) which has been found generally to have a beneficial effect on the cell size of the expanded compositions, and also acts as lubricant. The concentration of the metal stearate in the composition may be 0.1 to 10% by weight or greater, but is preferably from 0.1% to 0.5% by weight.

In a further embodiment, the present invention provides a process for preparing an article of a foamed plastic material which comprises heating a thermoplastic polymeric composition comprising azodicarbonamide and a polymeric material selected from polyolefins and olefin copolymers, polystyrenes and styrene copolymers, and rigid polyvinyl chloride, in the presence of at least one finely divided material having a BET surface area of 200 to 350 m$^2$/g, to a temperature which is below the decomposition temperature of the polymeric material and above the decomposition temperature of the azodicarbonamide, to cause part of the azodicarbonamide to decompose, and subsequently cooling the foamed composition.

The thermoplastic composition may contain any of the additives set out above.

Preferably the article is produced by extrusion or injection moulding. In these applications, the advantages of the blowing agent composition are particularly apparent. However, the process is not limited to these applications, and is also suitable for the following and other applications.

The thermoplastic composition may be formed into a sheet by extruding, casting, calendering or spreading as a powder blend. If desired, the layer may be formed on to a backing member such as a resinous material, impregnated felt, coating paper or the like. The layer may optionally be overcoated with a protective plastics layer.

The thermoplastic composition may be fused, before foaming by heating to for example 100° – 150° C for 2.5 to 0.5 minutes if desired.

The thermoplastic composition may be heated in any of the usual ways, such as in hot air ovens or by infra red heaters, to decompose the blowing agent. The temperature at which decomposition takes place may vary with the composition used, but 150° to 280° C is generally suitable. The time during which the heating is carried out will depend on the temperature and the degree of decomposition required, but is preferably from 15 to 300 seconds.

The following examples are given to illustrate the present invention; all parts and percentages being by weight.

EXAMPLE 1

An expandable thermoplastic composition was prepared by milling together at 100° C, on a two roll milling machine, polyethylene (available as Alkathene WJG11), 1% azodicarbonamide (available as Genitron AC2) and 1% particulate silica having a BET surface area of 250 m$^2$/g (available as Syloid 72).

The composition was extruded at a rate of 2.4 kg/hr through a rotating screw extrusion apparatus having a temperature profile along the barrel of 125°/220°/235°/225° C, a screw speed of 15 rpm, and an extrusion barrel diameter of 3.75 cm. The extruded foamed plastic had a good cell structure. After 50 hours the screw flights were examined and were found to be clear of any deposit.

By way of comparison, the procedure was repeated but without the presence of the silica. After only 30 hours a hard white deposit had formed on 3 flights of the screw.

EXAMPLE 2

An expandable thermoplastic composition was prepared as in Example 1 from Alkathene WJG11, 0.5% azodicarbonamide, 0.59% Syloid 72 and 0.5% magnesium stearate.

The composition was extruded as in Example 1. The product had a very fine cell structure, a density of 0.5 g/cm$^3$, and cooled without distortion.

By way of comparison, the procedure was repeated without the presence of the silica, and the product obtained had a fine cell structure and a density of 0.45 g/cm$^3$, but distorted on cooling.

EXAMPLE 3

The following blowing agent composition was prepared by blending:

a. 62.5% azodicarbonamide (available as GENITRON AC2) 37.5% silica (available as NEOSYL ET).

NEOSYL ET has a BET surface area of approximately 200 m$^2$/g and an available water content of approximately 12%. The composition therefore contains approximately 6 parts water per 100 parts azodicarbonamide. It was found to be free-flowing and stable on storage.

An expandable thermoplastic composition was prepared by milling together at 120° C on a two roll milling machine, 100 parts polyethylene (available as ALKATHENE WJG11) and 2 parts of the composition (a).

The composition was extruded at a rate of 2.4 kg/hr through a rotating screw extrusion apparatus having a temperature profile along the barrel of 125°/220°/235°/225° C, a screw speed of 15 rpm, and an extrusion barrel diameter of 3.75 cm. The extruded foamed plastic had a good, uniform cell structure. After 100 hours operation, the screw flights were examined and were found to be clear of any deposit.

COMPARATIVE EXAMPLE

A blowing agent composition was prepared by blending:

62.5% azodicarbonamide (available as GENITRON AC 2)

37.5% Silica (available as AEROSIL R 927)

AEROSIL R 972 has a BET surface area of 120± 30 m²/g and an available water content of approximately 1.5%. The composition contains approximately 0.74 parts of water per 100 parts of azodicarbonamide.

A thermoplastic composition prepared from 100 parts of polyethylene and 2 parts of the blowing agent composition was extruded at a rate of 2.4 kg/hr through a rotating screw extruder having a temperature profile of 125°/220°/235°/ 225° C along its barrel, a screw speed of 15 rpm and an extrusion barrel diameter of 3.75 cm.

After 20 hours operation the surface finish of the foamed plastic had deteriorated and on cooling and stripping down the extruder it was found that the last three screw flights were coated in a hard deposit, which was subsequently analysed as cyanuric acid.

I claim:

1. A particulate blowing agent composition comprising azodicarbonamide, and a colloidal of fumed silica having a BET surface area of 200 to 400 m²/g and an available water content of 2 to 20% by weight, the weight ratio of silica to azodicarbonamide being from 1:5 to 5:1 and such as to provide 1.5 to 20 parts by weight available water per 100 parts by weight azodicarbonamide.

2. A particulate blowing agent composition according to claim 1 wherein the silica has a BET surface area of 250 to 300 m²/g.

3. A particulate blowing agent composition according to claim 1 wherein the silica is colloidal silica.

4. A particulate blowing agent composition according to claim 1 containing 100 parts by weight azodicarbonamide and 40 to 80 parts by weight silica.

5. A particulate blowing agent composition according to claim 1 containing at least one compound containing available water and selected from calcium chloride, calcium oxalate, calcium sulphate, calcium carbonate, hydrated calcium oxide, calcium hydroxide, calcium tartrate, magnesium sulphate, magnesium orthophosphate, magnesium hydroxide, magnesium benzoate, potassium carbonate, copper sulphate, zinc sulphate, ferric sulphate, borax, barium hydroxide and aluminum hydroxide.

6. A particulate blowing agent according to claim 1 containing oxamide in a weight ratio oxamide: azodicarbonamide of 2:1 to 1:2.

7. A thermoplastic composition which comprises a thermoplastic polymeric material selected from polyolefins and olefin copolymers, polystyrenes and styrene copolymers, and polyvinyl chlorides and vinyl chloride copolymers; 0.01 to 10% azodicarbonamide; and at least one finely divided colloidal or fumed silica having a BET surface area of 200 to 400 m²/g and an available water content of 2 to 20% by weight, the weight ratio of silica to azodicarbonamide being from 1:5 to 5:1 and such as to provide 1.5 to 20 parts by weight available water per 100 parts by weight azodicarbonamide.

8. A process for preparing an article of a foamed plastics material which comprises heating a thermoplastic polymeric composition comprising a polymeric material selected from polyolefins and olefin copolymers, polystyrenes and styrene copolymers, and polyvinyl chloride and vinyl chloride copolymers; 0.01 to 10% azodicarbonamide; and at least one finely divided colloidal or fumed silica having a BET surface area of 200 to 400 m²/g and an available water content of 2 to 20% by weight, the weight ratio of silica to azodicarbonamide being from 1:5 to 5:1 and such as to provide 1.5 to 20 parts by weight available water per 100 parts by weight azodicarbonamide, to a temperature which is below the decomposition temperature of the polymeric material and above the decomposition temperature of the azodicarbonamide, to cause part of the azodicarbonamide to decompose, and subsequently cooling the foamed composition.

9. A process according to claim 8 including the step of extruding the thermoplastic composition.

10. A process according to claim 8 including the step of injection moulding the thermoplastic composition.

11. A particulate blowing agent composition according to claim 1 wherein the silica is fumed silica.

12. In a process for extruding or molding an article of foamed plastics material which comprises heating the thermoplastic polymeric composition with azodicarbonamide as a blowing agent and extruding or molding said thermoplastic polymeric composition in an extrusion or molding apparatus and wherein the deposition of decomposition products of the azodicarbonamide on said apparatus occurs, the improvement which comprises minimizing said deposition by incorporating into said thermoplastic polymeric composition at least one colloidal or fumed silica having a BET surface area of 200 to 400 m²/g and an available water content of 2 to 20% by weight, the weight ratio of silica to azodicarbonamide being from 1:5 to 5:1 and such as to provide 1.5 to 20 parts by weight available water per 100 parts by weight azodicarbonamide.

13. A process according to claim 12 wherein colloidal silica is employed.

14. A process according to claim 12 wherein fumed silica is employed.

15. A thermoplastic composition according to claim 7 wherein the silica is colloidal.

16. A thermoplastic composition according to claim 7 wherein the silica is fumed.

17. A process according to claim 8 wherein the silica is colloidal.

18. A process according to claim 8 wherein the silica is fumed.

* * * * *